United States Patent
Van Laere

(10) Patent No.: US 12,345,608 B2
(45) Date of Patent: Jul. 1, 2025

(54) OPTICAL HYDROCARBON LEAK DETECTION SENSOR

(71) Applicant: Maarten Van Laere, Heverlee (BE)

(72) Inventor: Maarten Van Laere, Heverlee (BE)

(73) Assignee: ALPINCO BV, Zaventum (BE)

( * ) Notice: Subject to any disclaimer, the term of this patent is extended or adjusted under 35 U.S.C. 154(b) by 0 days.

(21) Appl. No.: 17/543,963

(22) Filed: Dec. 7, 2021

(65) Prior Publication Data

US 2022/0187152 A1 Jun. 16, 2022

Related U.S. Application Data

(60) Provisional application No. 63/124,019, filed on Dec. 10, 2020.

(51) Int. Cl.
*G01M 3/04* (2006.01)
*G08B 7/06* (2006.01)

(52) U.S. Cl.
CPC .............. *G01M 3/04* (2013.01); *G08B 7/06* (2013.01)

(58) Field of Classification Search
CPC ........ G01M 3/04; G01M 3/045; G01M 3/047; G01M 3/38; G01M 3/02; G08B 7/06; G01N 21/65; G01N 33/28; G01N 33/241; G01N 2021/1793; G01N 2015/019; G01N 33/1833; G01N 33/1826
See application file for complete search history.

(56) References Cited

U.S. PATENT DOCUMENTS

| | | | |
|---|---|---|---|
| 2006/0267756 A1* | 11/2006 | Kates ................... | G08B 21/182 340/521 |
| 2010/0064773 A1* | 3/2010 | Meredith .............. | G01M 3/047 73/40 |
| 2010/0122750 A1* | 5/2010 | Erben ................... | B64F 1/28 141/95 |
| 2015/0211928 A1* | 7/2015 | Itoh ...................... | G01J 3/32 356/402 |
| 2017/0082593 A1* | 3/2017 | Nedwed ................ | G01N 21/94 |
| 2017/0299501 A1* | 10/2017 | Chenault .............. | G06T 5/50 |
| 2018/0188129 A1* | 7/2018 | Choudhury .......... | G01N 21/85 |
| 2018/0191967 A1* | 7/2018 | Kester .................. | G01J 5/0014 |
| 2019/0145891 A1* | 5/2019 | Waxman ............. | G01N 21/3504 356/409 |
| 2020/0240906 A1* | 7/2020 | Waxman ............. | G01N 21/3504 |

\* cited by examiner

*Primary Examiner* — Catherine T. Rastovski
*Assistant Examiner* — Sharad Timilsina
(74) *Attorney, Agent, or Firm* — White-Welker & Welker, LLC; Matthew T. Welker, Esq.

(57) ABSTRACT

A method to have a fast, contactless & re-usable sensor to detect the presence of hydrocarbons on surfaces by analyzing the reflected light of the sensor. The invention generally is a sensor device which includes a light emitting source, a reflective light spectrum analyzer which is able to detect the specificity of the reflectivity of hydrocarbons on surfaces.

18 Claims, 1 Drawing Sheet

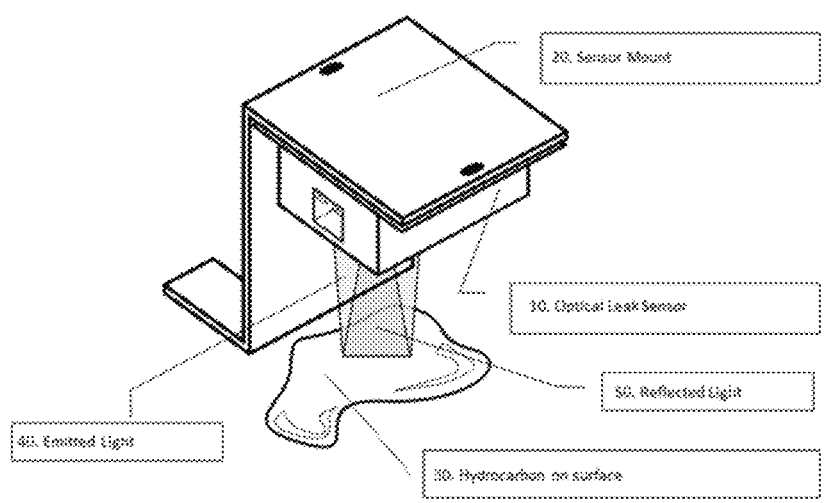

OPTICAL HYDROCARBON LEAK DETECTION SENSOR

TECHNICAL FIELD OF THE PRESENT INVENTION

The present invention relates generally to a new, simple, fast, safe, re-usable and cost-effective way to detect the presence of hydrocarbons. More specifically the present invention relates to a method to have a fast, contactless & re-usable sensor to detect the presence of hydrocarbons on surfaces by analyzing the reflected light of the sensor. The invention generally is a sensor device which includes a light emitting source, a reflective light spectrum analyzer which is able to detect the specificity of the reflectivity of hydrocarbons on surfaces.

BACKGROUND OF THE PRESENT INVENTION

Industrial applications using in their operations equipment that use hydrocarbons in them, may require monitoring for any leak. This is typically done by using a sensor or device that has a specific cable which is sensitive to hydrocarbons. The cable is laid on the surface to be monitored. When the cable comes into contact with a hydrocarbon then the sensor can be triggered. Current leak detection solutions for hydrocarbons are contact based. Most leak detection solutions are very whereby it may require a long time of the cable being in contact with the hydrocarbon. Newer generations of hydrocarbon leak sensors put on the market sometimes offer faster reaction times. Such reaction times are still taking minutes to trigger.

Next to being slow, current solutions for detecting hydrocarbon leaks are contact based. Said solutions require to be in contact with the hydrocarbon in order to be triggered. This has two major disadvantages: safety and re-usability. Hydrocarbons are flammable and contact with electronics may cause a security risk. While most solutions carry fire safety certifications, a risk can't be excluded.

The second disadvantage is that most of current solutions compared to the invention are single use. As soon as sensor has been triggered it has to be replaced. This poses a major problem to installers. It prevents installers to do a correct commission of a leak monitoring system as the hydrocarbon leak detector cannot be tested without requiring replacement.

Using the invention, hydrocarbon leaks can be detected in seconds and the newly invented sensor can be reused an unlimited number of times: the invention relies on contactless light analysis which enables to detect hydrocarbon on surfaces in real time or seconds.

SUMMARY OF THE INVENTION

The invention generally relates to a new, simple, fast, safe and re-usable method for detecting hydrocarbon leaks on surfaces. Such surfaces could be in solid or liquid state. Compared to existing solutions, the present invention is contactless and is based on the analysis of the reflected light of a surface. The optical leak sensor is mounted over the surface that it needs to monitor. It captures the reflected light by the surface and analyses it for the presence of hydrocarbon. It does so by recognizing the specificity the reflective light signature of a hydrocarbon.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawing.

The invention is capable of other embodiments and of being practiced and carried out in various ways. Also, it is to be understood that the phraseology and terminology employed herein are for the purpose of the description and should not be regarded as limiting.

The main object is to provide a fast method for detecting hydrocarbon on surfaces. Current leak detection solutions rely on slow hydrocarbon sensitive leak cables or similar.

Another object is to provide a new method that allows for a hydrocarbon leak sensor to be reused compared to current solutions which are typically single use only. This makes the invention a lower cost alternative compared to current alternatives.

Another object is to provide a method is to enable the commissioning of hydrocarbon leak detection systems in a more reliable way by enabling to test the complete setup and then leave it as is without needing the replace the leak sensitive cable or device.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 illustrates a possible implementation of the invention consisting of an optical hydrocarbon leak sensor with having on board a light emitting unit, a light spectrum analyzer and a mount for the sensor to place it above the area requiring monitoring.

INDEX OF ELEMENTS

10: Optical leak sensor
20: Mounting kit
30: Hydrocarbon on surface
40: Emitted light
50: Reflective light

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

A. Overview

Turning now descriptively to the drawing in FIG. 1, in which similar reference characters denote similar elements throughout the side view, the FIGURE illustrates an optical hydrocarbon leak sensor and its operation. The drawing shows a possible embodiment of the device which includes the core features to make the detection of hydrocarbon on a surface possible. The invention is based on capturing the light reflected by a surface and identifying in that light the distinct reflection of a hydrocarbon.

FIG. 1 is a side view of the present invention. FIG. 1 shows a possible implementation of the invention consisting of an optical hydrocarbon leak sensor with having on board a light emitting unit, a light spectrum analyzer and a mount for the sensor to place it above the area requiring monitoring.

B. Light Emitting Source

In our embodiment of the invention, we emit from the sensor a light onto the surface to be monitored for the presence of hydrocarbon. Other embodiments may use a light emitting source which is not within the same device as the Light spectrum analyzer. It could even potentially just use ambient light in applications where this is possible. Adding a light source in our embodiment allows us to provide a stable reflectivity of the surface independent of light conditions present on the surface to be monitored. In a possible embodiment, the light source could automatically adjust intensity based on standard light conditions.

C. Reflective Light Spectrum Analyzer

This is the core of the invention: a system capturing the light reflected by a surface and then detect if in the captured light the properties of hydrocarbon can be detected. By using light properties as a method to detect the presence of hydrocarbon the invention addresses two limitations of other current solutions. It is contactless as it uses light as a method to detect hydrocarbons. By using light as a method to identify hydrocarbons, it is also very fast in detecting hydrocarbons. Unlike current solutions requiring minutes to detect a leak, the invention can identify in near real-time the properties of hydrocarbon in the reflective light.

D. Mounting Kit for the Sensor

The mounting kit ensures for the right placement of the sensor over the surface to be able to perform the monitoring of the surface for the presence of a hydrocarbon.

E. Connections of Main Elements and Sub-Elements of Invention

The hydrocarbon leak detection sensor (element 1 in FIG. 1) is mounted onto a plate to hold the sensor above the surface to be monitored for a hydrocarbon leak (element 2 in FIG. 1).

F. Alternative Embodiments of Invention

While in this embodiment of the invention we use a light source and reflective light spectrum analyzer inside one device, those functions could be part of different devices. The sensor could operate as a standalone device with additional functionalities like, but not limited to, audible and visual alerts. The sensor could also be connected to another device using any type of wired or wireless connection. The analysis of the reflected light can be done within the sensor itself but also by another system that is connected to the system that captures the reflective light.

G. Operation of Preferred Embodiment

In FIG. 1 we show our preferred embodiment of the sensor whereby it is screwed on a mount and is placed above the surface to be monitored. The sensor has a light emitting source to ensure that there is enough luminosity to analyze the reflected light so that it can work in dark environment as well as environments with changing luminosity. The captured reflective light is then processed and analyzed in the sensor to see if, based on algorithms, the reflection is from a surface containing a hydrocarbon on it.

Currently a common method to detect hydrocarbon leaks is to use a contact-based solution which is typically a cable which is sensitive to hydrocarbons like, but not limited to, oil and fuel. This is a slow and expensive solution. Slow because it requires a long time before the cable is triggered. Expensive as most current leak solutions are single use only.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention in which all terms are meant in their broadest, reasonable sense unless otherwise indicated. Any headings utilized within the description are for convenience only and have no legal or limiting effect.

Thus, it is appreciated that the optimum dimensional relationships for the parts of the present invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the present invention in which an exclusive property or privilege is claimed are defined as follows:

1. An optical hydrocarbon leak sensor device to detect the presence of liquid hydrocarbons on surfaces by analyzing the reflected light off of a surface by a sensor, the device comprising:
    a light emitting source; and
    a reflective light spectrum analyzer which is able to detect a specificity of a reflectivity of liquid hydrocarbons on surfaces;
    wherein the light emitting source
        emits light from the sensor a light onto the surface to be monitored for a presence of liquid hydrocarbons; and
        is within the same device as the light spectrum analyzer.

2. The device of claim 1, wherein the light emitting source is not within the same device as the light spectrum analyzer.

3. The device of claim 1, wherein the light emitting source is ambient light in applications where this is possible.

4. The device of claim 1, wherein the light emitting source provides a stable reflectivity of the surface independent of light conditions present on the surface to be monitored.

5. The device of claim 1, wherein the light emitting source automatically adjusts intensity based on standard light conditions.

6. The device of claim 1, wherein the reflective light spectrum analyzer
    is a system capturing the light reflected by a surface; and
    then detects if in the captured light the properties of a liquid hydrocarbon are detected.

7. The device of claim 6, wherein
    the captured reflective light is then processed and analyzed in the sensor to see if, based on algorithms, the reflection is from the surface containing the liquid hydrocarbon on it.

8. The device of claim 1, wherein
    using light as a method to detect liquid hydrocarbons; and
    using light as a method to identify liquid hydrocarbons.

9. The device of claim 1, wherein
    the sensor can identify, in near real-time, the properties of the liquid hydrocarbon in the reflective light from the surface.

10. The device of claim 1, further comprising
    a mount for the sensor to place it above the area requiring monitoring of the surface for the presence of a liquid hydrocarbon.

11. The device of claim 10, wherein
    the liquid hydrocarbon leak detection sensor is mounted onto a plate to hold the sensor above the surface to be monitored for a liquid hydrocarbon leak.

12. The device of claim 10, wherein
    the sensor is screwed on a mount;
    the sensor with attached mount is placed above the surface to be monitored; and
    the sensor has a light emitting source to ensure that there is enough luminosity to analyze the reflected light so that it can work in a dark environment as well as environments with changing luminosity.

13. The device of claim 1, wherein
    the sensor operates as a standalone device with additional functionalities including audible and visual alerts.

14. The device of claim 1, wherein
    the sensor is connected to another device using any type of wired or wireless connection.

15. The device of claim 1, wherein
    the analysis of the reflected light can be done within the sensor itself.

16. A method to have a fast, contactless and re-usable sensor to detect the presence of liquid hydrocarbons on surfaces by analyzing the reflected light of the sensor, the method comprising:
    providing a sensor device which includes
        a light emitting source, and
        a reflective light spectrum analyzer which is able to detect the specificity of the reflectivity of liquid hydrocarbons on surfaces;
    using light as a method to detect liquid hydrocarbons;
    using light as a method to identify liquid hydrocarbons;
    capturing the light reflected by a surface; and
    identifying in that light the distinct reflection of a liquid hydrocarbon.

17. The method of claim 16, wherein
    the captured reflective light is processed and analyzed in the sensor to see if, based on algorithms, the reflection is from a surface contains a liquid hydrocarbon on it.

18. The method of claim 16, further comprising the step of
    identifying, in near real-time, the properties of a liquid hydrocarbon in the reflective light from a surface.

* * * * *